UNITED STATES PATENT OFFICE.

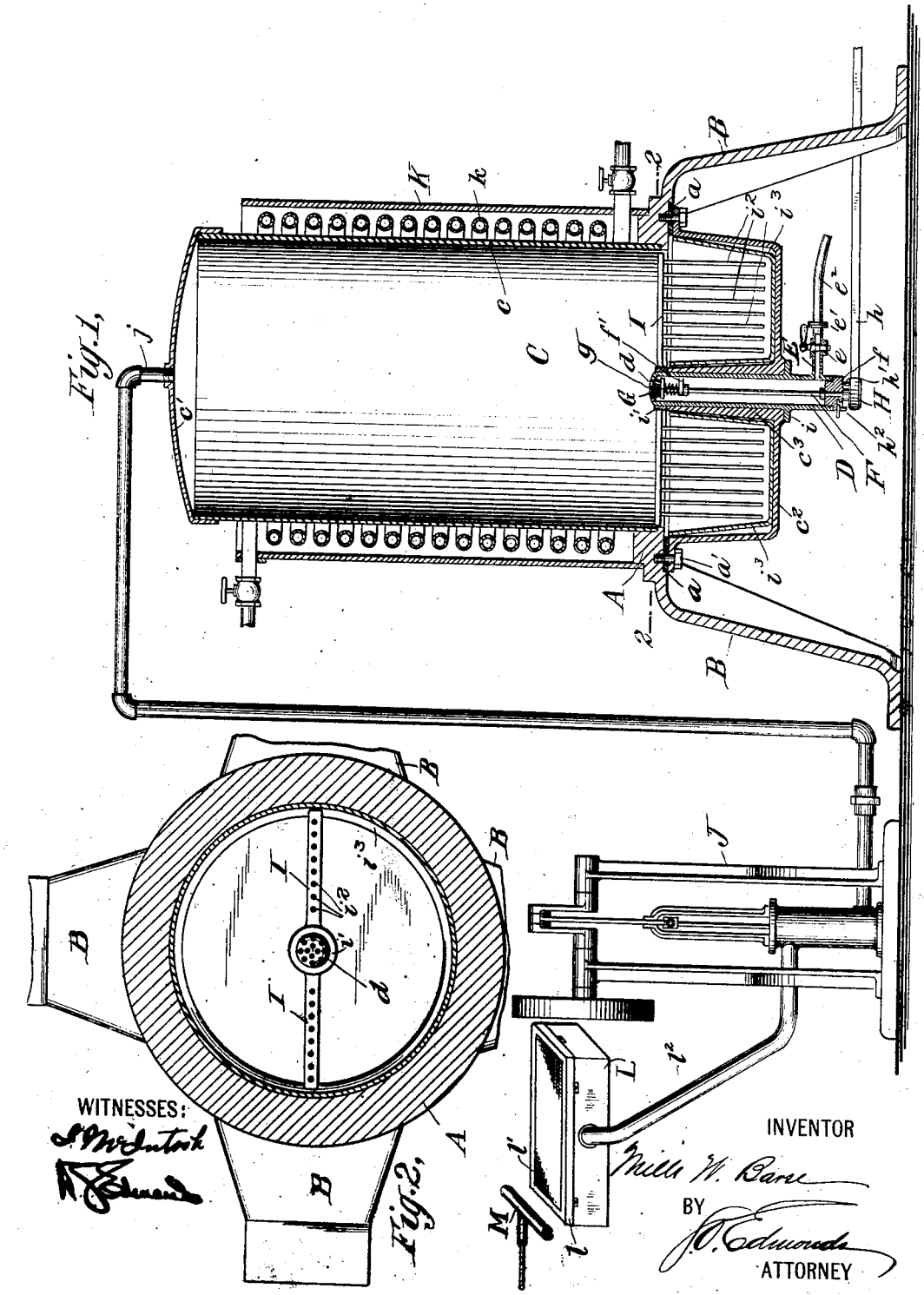

MILLS W. BARSE, OF BUFFALO, NEW YORK, ASSIGNOR, BY MESNE ASSIGNMENTS, TO DANIEL RIDGEWAY HENDRICKS, OF BROOKLYN, NEW YORK.

DESICCATING APPARATUS.

No. 875,405.　　　　Specification of Letters Patent.　　　　Patented Dec. 31, 1907.

Application filed February 12, 1906. Serial No. 300,616.

*To all whom it may concern:*

Be it known that I, MILLS W. BARSE, a citizen of the United States, and a resident of Buffalo, in the county of Erie and State of New York, have invented a certain new and useful Improvement in Desiccating Apparatus, of which the following is a specification.

This invention relates to apparatus for use in the separation of materials containing moisture to withdraw therefrom the water with which they are combined and produce a powdered substance consisting of the solids of the original material.

The apparatus may be used to advantage in desiccating articles of food, such as butter, eggs, meat, etc., and is of particular utility in the treatment of milk to obtain the solids therefrom in powdered form. This powdered milk may, if desired, be afterwards recombined with water or a liquid containing water with the added benefit, however, of pasteurization, if desired, accomplished during the separating process.

My invention involves the provision of apparatus for desiccating materials containing moisture by injecting the materials in a spray into a receptacle from which the air has been withdrawn and to which is connected a suitable exhausting device for carrying off the vapor formed from the water in the injected material. The material to be separated preferably enters the receptacle at the bottom thereof through a suitable spraying device, the form of which may vary with the materials to be separated. The receptacle having been exhausted of air, the water in the material thus sprayed is immediately vaporized and the continued operation of the pump or other exhausting device draws the water vapor thus formed from the receptacle while the solids of the material drop by gravity to the bottom of the receptacle, where they may be collected in a suitable receiver. Preferably the bottom of the receptacle, though joined to the body portion thereof by an airtight joint, is removable and a pan may be provided resting on this removable bottom to receive the solids which drop therein. I may also employ a device adapted to be operated from outside the receptacle for stirring the solids collected in the receiver, in order that any moisture remaining therein may be drawn off in the form of vapor to make the separation more complete. As the continued operation of the pump is apt to reduce the temperature within the receptacle below that at which the separation is best effected, I provide a heating device which may consist of a heating coil arranged in a casing surrounding the receptacle and by which the temperature within the separating chamber may be controlled as desired.

I have illustrated in the accompanying drawings an apparatus which may be used in the manner above indicated, but I do not wish to be understood as limited to this particular construction, as various modifications can be made therein.

In these drawings, Figure 1 is a sectional elevation of the apparatus, and Fig. 2 is a section on line 2—2 of Fig. 1.

In the drawings is shown a supporting structure consisting of an annulus A and legs B formed integral therewith. Secured on this annulus is the separating chamber C consisting of the cylindrical side wall $c$, the top $c'$ and the bottom $c^2$. In order that there shall be no leakage of air into the separating chamber, the joints between the annulus A and wall $c$ and between wall $c$ and top $c'$ are made airtight. The bottom $c^2$ is also secured to annulus A by an airtight joint, but, in order that the bottom may be readily removable, this is preferably done by inserting a gasket $a$ between the coacting surfaces and providing bolts $a'$ which extend through a flange at the edge of bottom $c^2$, through gasket $a$ and into the annulus A. The bottom $c^2$ of the receptacle has a sleeve $c^3$ formed integral therewith at its center and constituting a bearing for a tubular member D which extends upwardly therethrough, its upper end entering the receptacle. This end of member D is so constructed as to spray the material flowing therethrough to the receptacle, and for this purpose may be covered with a plate $d$ having many fine openings therein. The material enters the member D by a branch pipe E having a valve $e$ therein and adapted to be connected by a detachable coupling $e'$ with a supply pipe $e^2$ so that the pipe $e^2$ may be disconnected from the pipe E at the coupling $e'$ to permit of rotating member D by suitable power-driven devices in the manner and for the purpose hereinafter set forth. Closing the lower end of member D is a plug $f$ through which extends a rod F. This rod is rotatable in the bearing formed by the opening in plug D and a bearing $f'$, and at its upper end carries a brush G. A spring $g$ acts on rod F to hold brush G against the under side of plate $d$. On the lower end of rod F is secured a pulley H, on which runs a belt $h$ to communicate rotary motion to rod F and brush G. In order to cause rotation of tubular member D, a suitable clutch may be provided between pulley H and the member, as for instance a projection $h'$ on the pulley and a coacting clutch-member $h^2$ movable in a slot in plug $f$ to carry its end into or out of the path of movement of projection $h'$. Member D is positioned in its bearing in sleeve $c^3$ by collars $i$ and $i'$, the latter of which is detachably secured on the member near its upper end. Extending radially outward in opposite directions from collar $i'$, are supports 1, from each of which depend a plurality of rods $i^*$ which extend down into a pan $i^3$ resting upon the bottom $c^2$ of the separating chamber. This pan preferably has an outer wall and an inner tubular member which, when the pan is in position, lie close to the edge of bottom $c^2$ and the sleeve $c^3$ respectively.

Secured on the annulus A is a cylindrical casing K forming between it and the wall $c$ of the receptacle C an annular chamber, and located in this chamber is a coil of piping $k$ through which steam or hot water may be led to control the temperature within the receptacle C. Entering the top $c'$ of the receptacle C is a pipe $j$ by which the receptacle is connected to a suitable exhausting device, as the reciprocating pump J.

The operation of the apparatus thus constructed will now be described. The pump J is first operated to remove most of the air from the receptacle C, and the milk or other material to be separated is then admitted through pipe E to the tubular member D and then through the openings in plate $d$ to the receptacle. The openings in plate $d$ operate to break up the material into fine particles, so that the material is injected into the receptacle in the form of a spray. In the evacuated receptacle the water in these fine particles of the material is vaporized and the solids therein drop down into the pan $i^3$. The vapor thus formed is drawn off by the pump and the solids collect in the pan. If at any time the solids of the material collect upon the plate $b$ so much as to obstruct the passage of the material through the openings therein, the rod F is rotated by belt $h$ and the brush G at the upper end of the rod removes the collected material from the plate. After the operation has continued for some time, the valve $e$ is moved to the closed position, the supply-pipe $e^2$ is disconnected from pipe E at the detachable coupling $e'$ and the clutch-member $h^2$ moved to bring it into coaction with the projection $h'$; belt $h$ is then caused to rotate pulley H and with it the tubular member D, this member being then free of the pipe $e^2$, and the stirring rods $i^2$ carried by the member D agitate the powdered material collected in pan $i^3$ so that all of the particles thereof are again exposed and any moisture remaining therein is vaporized and drawn off. The rate at which the milk is admitted to the receptacle can be controlled by the valve $e$ or other suitable means and should be regulated with respect to the capacity of the exhausting device so that the vapor will not become too dense within the receptacle, since otherwise the separation would be slow and incomplete. If the vapor is drawn off by the pump as soon as it is formed, the separation will be practically complete and the solids of the milk or other material will collect in the pan $i^3$; when the pan is full, the bottom $c^2$ of the receptacle can be removed by withdrawing the bolts $a'$ and the pan emptied.

Since it may happen that some of the solids of the material which is being separated will be carried over with the air and vapor by the exhausting device, especially when the material is admitted to the receptacle more rapidly than usual, I prefer to provide a collector arranged to gather and save these solids which are carried over. This may be inserted between the receptacle and the exhausting device or, as shown in the drawings, may be beyond such device, in which case I prefer to use a centrifugal rather than a reciprocating pump. This collector preferably consists of a box L having a removable cover $l$ fitting tightly down upon the box and having therein an opening covered by a screen $l'$ of very fine mesh, so fine that none of the solids of the material can be carried through. A pipe $l^2$ connects the pump to the box L so that the pump exhausts through the box. After a period of operation, the pump is stopped, the cover $l$ taken off, and the solids in the box L removed. The screen $l'$ is of such fine mesh that it should be cleaned by a blast of air, and I show at M a cleaning device which may be used for this purpose; it consists of a tube having a narrow slot therein and connected to a source of supply of compressed air, a suitable handle being provided for moving the cleaner over the screen $l'$.

Having now described my invention, what I claim as new therein and desire to secure by Letters Patent is as follows:—

1. In a desiccating apparatus, an air-tight receptacle, a sprayer entering the bottom thereof, its end extending above the bottom of the receptacle, a pan for receiving the desiccated material supported on the bottom of the receptacle below said end, means for supplying the material to be desiccated to said sprayer, and a pump connected to the upper portion of the receptacle for exhausting air and vapor therefrom, substantially as set forth.

2. In a desiccating apparatus, an air-tight receptacle, a casing inclosing the same but separated therefrom, piping for carrying a heating medium located in the space between the receptacle and the casing, a removable bottom for the receptacle, a tube passing through the bottom and extending above the same, said tube having a plurality of fine openings in its upper end, a pan supported on the bottom of the receptacle, and a pump connected to the upper portion of the receptacle for exhausting air and vapor therefrom, substantially as set forth.

3. In a desiccating apparatus, an air-tight receptacle having a removable bottom, a rotatable tube extending through said bottom, means for carrying the material to be desiccated to said tube, a detachable coupling in said means, means for spraying the material to be desiccated into said receptacle through said tube, means carried by said tube within the receptacle for stirring the desiccated material collected upon the bottom of the receptacle, devices for rotating said tube, and a pump connected to the upper portion of the receptacle for exhausting air and vapor therefrom, substantially as set forth.

4. In a desiccating apparatus, an airtight receptacle, means for admitting thereto the material to be desiccated in the form of a spray, a receiver for the desiccated material at the bottom of the receptacle, means operated from outside the receptacle for stirring the material in said receiver, and a vacuum pump connected to the upper end of the receptacle, substantially as set forth.

5. In a desiccating apparatus, an airtight receptacle, a tube entering said receptacle, a nozzle at the inner end of said tube having small openings therethrough, a brush for cleaning said nozzle, means for rotating the brush from outside the receptacle, a pump connected to the upper end of said receptacle, and a receiver for the desiccated material, substantially as set forth.

6. In a desiccating apparatus, an airtight receptacle, means for admitting to the receptacle the material to be desiccated in the form of a spray, a vacuum pump connected to the receptacle for exhausting air and vapor therefrom, and means for collecting the solids drawn from the receptacle by said pump consisting of a box connected to the pump and having a fine mesh screen forming one side thereof to facilitate cleaning the screen by means of an air blast, substantially as set forth.

This specification signed and witnessed this 29th day of January, 1906.

MILLS W. BARSE.

Witnesses:
I. McINTOSH,
D. S. EDMONDS.